United States Patent
Ingistov et al.

(10) Patent No.: US 6,644,935 B2
(45) Date of Patent: Nov. 11, 2003

(54) METHOD AND APPARATUS FOR INCREASING THE EFFICIENCY OF A MULTI-STAGE COMPRESSOR

(76) Inventors: Steve Ingistov, 7825 Anise Ave., Los Angeles, CA (US) 90045; Denny L. McVey, 13708 Stagecoach Trail, Moorpark, CA (US) 93021

( * ) Notice: Subject to any disclaimer, the term of this patent is extended or adjusted under 35 U.S.C. 154(b) by 223 days.

(21) Appl. No.: 10/042,988

(22) Filed: Nov. 20, 2001

(65) Prior Publication Data

US 2002/0141882 A1 Oct. 3, 2002

Related U.S. Application Data

(63) Continuation-in-part of application No. 09/537,848, filed on Mar. 29, 2000, now Pat. No. 6,398,518.
(60) Provisional application No. 60/318,140, filed on Sep. 7, 2001.

(51) Int. Cl.[7] ............................. F04B 3/00; F04D 31/00; B05B 1/14
(52) U.S. Cl. ..................... 417/244; 415/116; 239/590.5
(58) Field of Search .......................... 417/244; 415/116, 415/117, 180; 239/590, 590.3, 590.5

(56) References Cited

U.S. PATENT DOCUMENTS

| | | | | |
|---|---|---|---|---|
| 2,549,819 A | * | 4/1951 | Kane | 415/116 |
| 2,810,607 A | * | 10/1957 | Hruby, Jr. | 138/45 |
| 4,358,249 A | * | 11/1982 | Hanson | 417/179 |
| 6,233,937 B1 | * | 5/2001 | Gray | 415/116 |

* cited by examiner

*Primary Examiner*—Charles G. Freay
*Assistant Examiner*—Michael K. Gray

(57) ABSTRACT

Nozzle assembly for injecting a liquid into a process unit through a cross fitting body having at least one of a first and second crossing passageway therethrough with a tubular member carrying a nozzle being injected through one of the cross passageways to position the nozzle carried on the tubular member for the injection of liquid into the processing unit with the liquid being supplied to the tubular member via the other crossing passageway through which liquid is supplied to openings in the tubular member which is in liquid communication with the first crossing passageway to supply liquid to the nozzle.

10 Claims, 4 Drawing Sheets

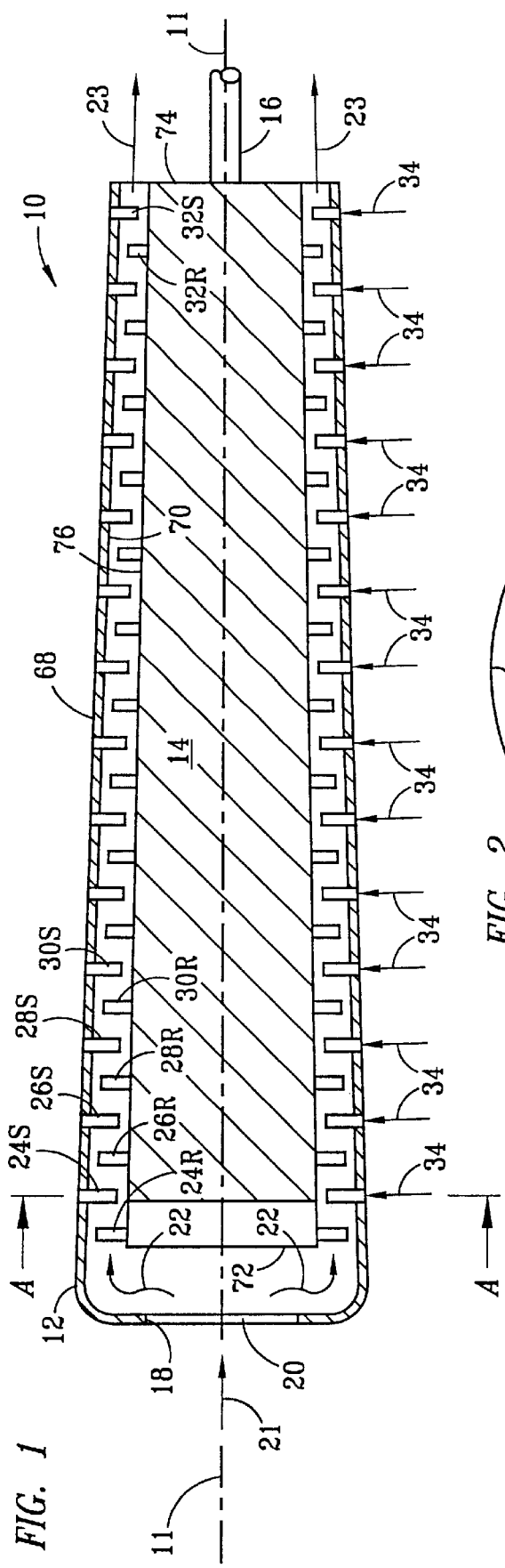
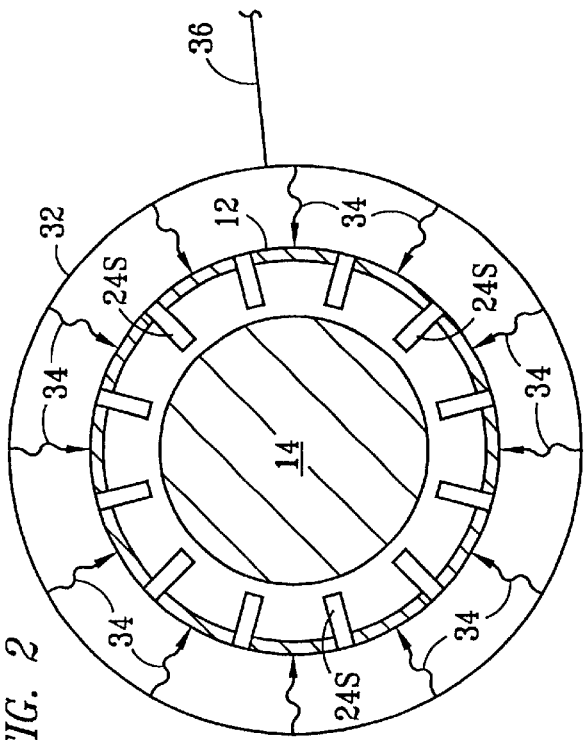

METHOD AND APPARATUS FOR INCREASING THE EFFICIENCY OF A MULTI-STAGE COMPRESSOR

RELATED APPLICATIONS

This application is a continuation-in-part of U.S. Ser. No. 09/537,848, "Method And Apparatus For Increasing The Efficiency Of A Multi-Stage Compressor," filed Mar. 29, 2000 by Steve Ingistov which issued as U.S. Pat. No. 6,398,518 on Jun. 4, 2002.

This application is entitled to and hereby claims the benefit of the filing date of provisional application No. 60/318,140, filed Sep. 7, 2001, entitled "Method And Apparatus For Increasing The Efficiency Of A Multi-Stage Compressor," by Steve Ingistov and Denny L. McVey.

FIELD OF THE INVENTION

This invention relates to an improvement in the fabrication and operation of multi-stage compressors to achieve increased efficiency by cooling the compressed gas in at least a portion of the stages and by cleaning the rotors in at least a portion of the e by the injection of cleaning chemicals via nozzles used for the injection of a cooling liquid into at least a portion of the stages. This invention further relates to a nozzle assembly for injecting a liquid into a multi-stage compressor.

BACKGROUND OF THE INVENTION

In many industrial applications such as the use of turbines to generate electrical power and the like, it is necessary that large volumes of gas, such as air , be compressed to relatively high pressures. While various types of gases such as hydrogen natural gas, and the like are frequently compressed, the present invention will be discussed primarily by reference to the compression of air, although it is also useful with other gases. Large quantities of air are typically compressed for use for the combustion of natural gas or the like to provide a gaseous stream for use in driving turbines to generate electricity.

When gases are compressed, it is well known that the temperature of the compressed gas increases as the pressure is increased. In some instances, when high pressures are desired, it has been necessary to use a first compressor followed by inter-stage cooling and subsequent compression in a second compressor to reach the desired compression levels within temperature limitations of the compressors. In some instances, more than two compression stages have been required.

The use of such inter cooler steps has not generally been considered feasible for multi-stage compressors, particularly axial compressors comprising a plurality of stages with each stage comprising a set of rotor blades and a set of stator blades which have been used to compress air for use in the generation of electricity.: Axial compressors have been the preferred types of compressor for this application.

A further problem in maintaining the capacity of compressors s used for such purposes has been the tendency of the compressor blades to foul. This results in a substantial loss of power in the compressor. Various techniques have been used in attempts to clean the blades and avoid the loss of power. Some such techniques are discussed in "Gas Turbine Compressor Washing State of the Art-Field Experiences," by Jean Pierre Stadler, The American Society of Mechanical Engineers, 98-GT-420, 1998. In this article various. Techniques have been discussed for cleaning deposits from the blades of compressors. It appears that the cleaning solutions were introduced via the air inlet to the compressors.

As a result of the large amount of air required for electrical power generation as well as the requirements for large volumes of other gases, a continuing search has been directed to the development of a method and a compressor design, which can more efficiently compress gases.

SUMMARY OF THE INVENTION

According to the present invention, increased efficiency in such compressors can be achieved by a method for increasing the efficiency of the compression in a multi-stage axial compressor by injecting a quantity of a finely-divided mist of a selected liquid into at least one stage of the compressor to reduce the temperature of a compressed gas in the at least one stage thereby permitting the compression at an increased efficiency.

The invention further comprises an improved multi-state axial compressor which includes a plurality of nozzles positioned to inject a quantity o a finely-divided mist of a selected liquid into at least one stage of the compressor to reduce the temperature of a compressed gas stream in at least one stage thereby enabling more efficient compression of the compressed gas and a reduction in the compressor power requirement.

The invention further comprises a multi-stage axial gas compressor comprising: an outer housing having an inside and an outside, an inlet and an outlet and supporting on its inner surface a plurality of rows of stator blades arranged around the inside of the outer housing; a rotor rotatably positioned inside the outer housing, having an outside, a first end near the inlet of the outer housing and a second end near the outlet of the outer housing and a plurality of rows of rotor blades arranged around the outside of the rotor, with at least a portion of the rows of rotor blades being between the rows of stator blades, each row of the rotor blades with a succeeding row of stator blades forming a single compressor stage; and, at leas one mist injection nozzle positioned to inject a selected quantity of a finely-divided mist of a selected liquid into the compressor between at least one pair of the stator blades in at least one of the rows of stator blades in at least one stage to enable more efficient compression of a compressed gas.

The invention further comprises a method for increasing the compressor efficiency in a multi-stage gas axial compressor comprising: an outer housing having an inside and an outside, an inlet and an outlet and supporting on its inner surface a plurality of rows of stator blades arranged around the inside of the outer housing; a rotor rotatably positioned inside the outer housing, having an outside, a first end near the inlet of the outer ho sing and an outlet near the outlet of the outer housing and a plurality of rows of rotor blades arranged around the outside of the rotor, each row of rotor blades taken with a succeeding row of stator blades forming a single compressor stage; and, at least one mist injection nozzle positioned to inject a selected quantity of a finely-divided mist of a selected liquid into the compressor be ween at least one pair of the stator blades in at least one of the rows of stator blades.

The invention further comprises a nozzle assembly for injecting a liquid into a process unit through a process unit outer wall, the assembly comprising: cross fitting body having at least one of a first crossing passageway and a second crossing passageway therethrough each of the crossing passageways having a first and a second end; a liquid inlet into at least one end of the first crossing passageway; a receptacle passage having a first and a second end and positioned to extend through the process unit outer wall with the second end of the second crossing passageway being sealingly connected to the first end of the receptacle passage; a tubular member having a first and a second end with the first end of the tubular member being closed to liquid flow from the tubular member through the first end of the tubular member, the tubular member being positioned through the second crossing passageway with the second end of the tubular member extending into the receptacle passage; a locking fitting positioned on the cross fitting body at the second end of the second crossing passageway; at least one liquid inlet into the tubular member from the first crossing passageway; and, a nozzle positioned on the second end of the tubular member to spray the liquid from the tubular member into the process unit through a plurality of openings in the nozzle.

BRIEF DESCRIPTION OF THE DRAWING

FIG. 1 is a cross sectional view of a multi-stage axial compressor;

FIG. 2 is a cross sectional end view of the compressor of FIG. 1 taken at line AA;

DESCRIPTION OF PREFERRED EMBODIMENTS

Figure 3:
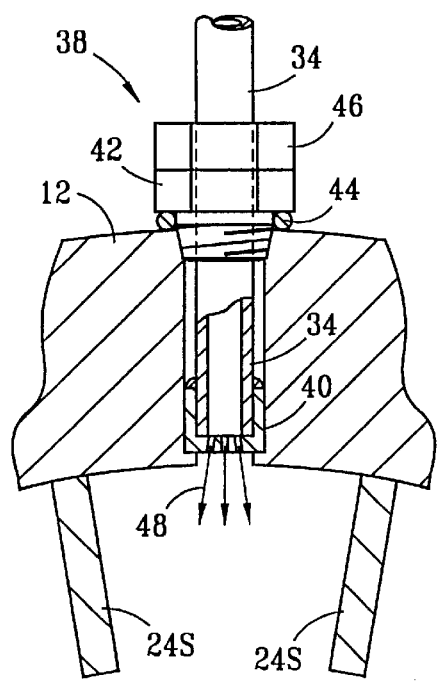
FIG. 3 is a cross sectional view of a nozzle installed through an outer housing of the compressor shown in FIG. 1.

In the discussion of the Figures, the same numbers will be used throughout to refer to the same or similar components. Further details of the construction and operation of compressors not necessary for the description of the present invention have no been shown or discussed.

In FIG. 1 an axial compressor 10 having a central axis 11 is shown. Compressor 10 comprises an outer housing 12 having an outside 68 and an inside 70. A rotor 14 is coaxially positioned inside outer housing 12 for rotation and includes an outside 76. Rotor 14 as shown is rotatably driven by a shaft 16 which may be coupled to any convenient power source. Outer casing 12 further includes an inlet 18, which is typically covered by a screen 20, or the like to prevent the passage of particulate materials into compressor 10. An arrow 21 shows airflow into compressor 10 with airflow inside compressor 10 to compression being shown by arrows 22. Compressor 10 includes a plurality of rotor blades 24R positioned in row generally around the outside 76 of rotor 14 to interact with stator blades 24S, which are positioned around inside 70 of outer housing 12. The rotor blades rotate as rotor 14 is rotated drive the gas toward a discharge from compressor 10 as shown by arrows 23. The discharged air can be passed to use in any of a variety of desired applications. In the applications mentioned previously, when the gas is air it may be passed to combination with a combustible gas of combustion to produce a hot gas to drive a turbine or the like. Similarly, if the gas is hydrogen or a hydrocarbon, the gaseous stream maybe passed to further processing use as a reactant in a process or the like.

A plurality of pairs of rotor and stator blades, are shown. Rotor and stator combinations 24R and 24S form a stage of compressor 10. Similarly combinations 26R and 26S, 28R and 28S, 30R and 30S, and 32R and 32S form stages. Not all of the rotor and stator blades have been numbered. As the gas is driven by the rotor blades, the stator blade tend to maintain relatively smooth flow along the axial length of compressor 10.

As shown by arrows 34, according to the present invention, cooling liquid is desirably injected into compressor 10 between the stator blades in the rows formed by stator 24S, 26S, 28S, etc. The cooling liquid may be injected into any or all of e stages and it is desirably injected at evenly spaced locations around each of the injected rows of stator blades.

In FIG. 2, a more detailed showing of the injection system is presented. An end view is taken at the front of the row of stator blades 24S as indicated by line AA. An end view of stator 14 is shown. For simplicity, stator 14 has been shown as a solid body whereas, in fact, it is typically a hollow-membered construction which is of sufficient strength to support rotor blades and the like. Such details form no part of the present invention. Stator blades 24 are shown with a nozzle feed line 34 extending to the spaces between each pair of stator blades. As shown, lines 34 are flexible hose lines, which extend from a manifold tubing 32 to a nozzle assembly 38 (shown in FIG. 3) at each injection site. Nozzle assemblies 38 are supplied with liquid from a feed line 36 through a manifold tubing 32 as will be discussed in greater detail hereinafter.

As noted previously, a cooling liquid may be injected between any or all of the pairs of stator blades, but is preferably injected at evenly spaced location around each injected row of stator blades. The determination as to whether an injection should be made between a selected number or all of the stator blades is a function of the amount of cooling desired in the particular stage and the like.

In FIG. 3, a more detailed construction of a nozzle position through outer housing 12 is shown. Two stator blades 24S are shown with the nozzle assemble 38 being positioned to inject a mist of a liquid between the two stator blades. Nozzle 40 designed to be normally recessed a slight distance outside the inside of outer housing 12. The nozzle construction details will be discussed subsequently but generally nozzle 40 is formed a relatively thick walled material, which includes a feed line 34, which extends to a junction with manifold tubing 32. While nozzle feed lines 34 have been shown as a tube in FIG. 3, the nozzle feed line upstream from tubular lines 34 may be, and desirably is a flexible hose as known to those skilled in the art for transmitting liquids under high pressure. The flexible hose may n fact extend from line 32 to and be connected to a fitting 42, which is used to sealing position nozzle assembly 38 through outer housing 12. Fitting 42 as shown includes a member, which ay be screwed into position and includes an O-ring seal 44. Alternatively, fitting 42 could be welded in position or otherwise sealingly retained in position by other mechanical means known those skilled in the art and sufficient to prevent the leakage of compressed air from inside our housing 12 around nozzle 40.

Figure 4:
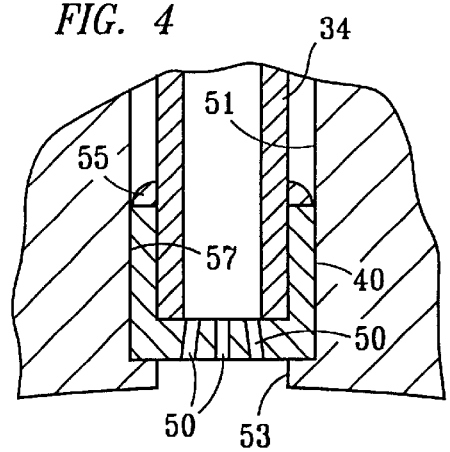
FIG. 4 is a cross sectional view of a nozzle suitable for use n the practice of the present invention; and, FIG. 5 is a schematic diagram of the piping used to inject the selected liquid into the compressor shown in FIG. 1.

Nozzle assembly 38 is shown in greater detail in FIG. 4 and comprises a nozzle 40 which is a heavy walled section which has openings 50 drilled to spray a finely-divided mist from the nozzle in a selected pattern and which is sealingly joined to line 34 by any suitable connection, shown in FIG. 4 as welds 55. The openings 50 are desirably drilled by a laser or other means for producing an extremely small passageway desirably less than about 0.015 inches in diameter. Nozzle assembly 38 is placed in an opening 51 positioned through an outer wall of outer housing 12, sized to closely contain nozzle assembly 38 and having a reduced diameter section 53 smaller than an outer diameter 57 of nozzle 40 at its outlet end into compressor 10. Tubing section 34 is a heavy walled tubing section, which extends upwardly to fitting 42 and may extend beyond fitting 42 if desired. As indicated previously, it is desirable that at least a portion of line 34 above fitting 42 comprise a flexible hose for ease of positioning and operation. Nozzle 40 is sized to closely fit in opening 51 and has an outer diameter larger than reduced diameter section 53. Nozzle 40 is fabricated of a heavy walled material and since it is larger in diameter than reduced diameter section 53, it cannot move through reduced diameter section and prevents the entry of any particulates, component parts and the line into compressor 10 via opening 51.

The manifold 32 shown in FIG. 2 may be tubing and may be positioned around outer shell 12 by any convenient method.

Figure 5:
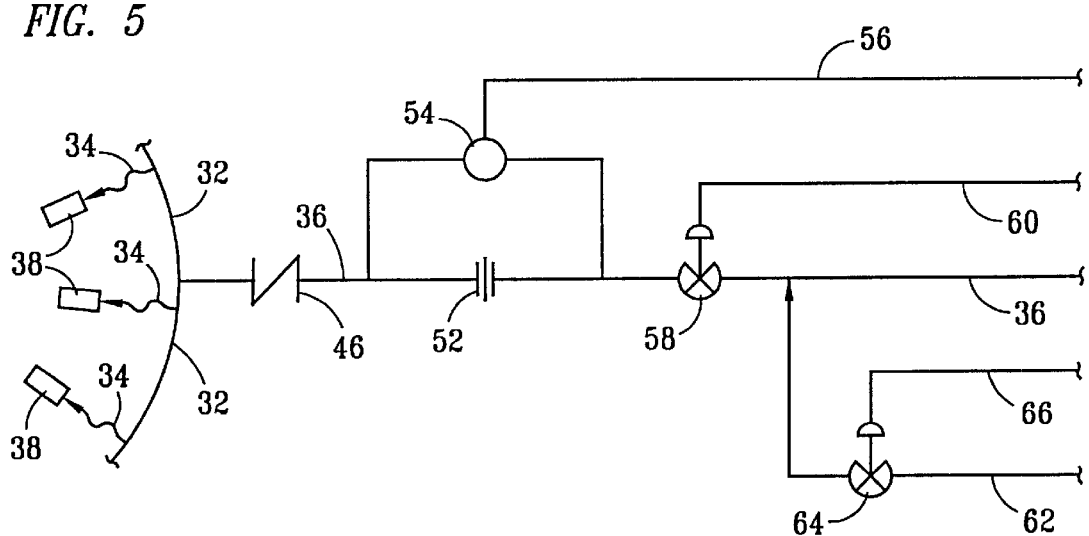

In FIG. 5, a schematic diagram of the flow lines to at least a portion of the nozzles is shown. Line 36, as shown in FIG. 3, includes upstream from line 32 a check valve 46. This check valve is effective to prevent any loss of compressed gas from compressor 10 in the event that there is no flow of liquid into compressor 10 via line 36. Check valve 46 prevents the flow of liquid or gas through line 36 from line 32 and outer shell 12. Upstream from check valve 46 a metering orifice 52 of any suitable design known to those skilled in the art is positioned in line 36. A differential pressure meter 54 is connected to measure the differential pressure across orifice 52 and determine the flow rate through line 36. Differential pressure gauge 54 includes a connection 56 to a computer (not shown) which is used to control the injection into compressor 10 as will be discussed farther. Further upstream from metering orifice 52, a control valve 58 is positioned in line 36. Control valve 58 is activated and regulate by a control connection 60 which may be actuated by a computer signal. The computer functions to regulate the flow of liquid through valve 58 for each stage of injection so that controlled quantities of liquid can be injected into compressor 10 as desired from line 36 through manifold line 32, flexible hoses 34 and nozzle assemblies 58 to control the temperature of the compressed gas flowing through compressor 10. The quantity of finely divided mist is a fraction or a percent of the total gas flow through the compressor. The additional mass flow as a result of the water addition is so small it can be neglected in calculations of power required to drive the compressor.

Further in FIG. 5, a line 62 is shown for the addition of a suitable cleaning chemical stream to line 36. The flow of liquid through this line is controlled by a control valve 64, which is regulated by a line 66 to a control computer. The control computer acts upon the information collected from lines 56, 60, 66 and other information such as the discharge temperature of the compressed gas, the temperature of the gas in at least a portion of the stages, and the like, to determine the amount of liquid to be charged through each nozzle into each stage. While not shown, temperature sensors may be positioned to detect the temperature in at least a portion of the stages and the like. Further, the gas pressure may be measured in portion of the stages and the inlet and outlet temperatures from compressor 10 may be measured as well as the outlet pressure.

The cleaning chemical is selected as known to those skilled in the art as to the specific chemical and the quantity required in view of the particular deposit to be removed.

In general, it is believed that the temperature in an axial compressor of the type shown will be such that any water injected into the compressor after about stage 8 will be completely vaporized into steam immediately. The liquid is injected as a finely divided mist, which may remain as a vaporous mist in the stages at a temperature below the oiling point of water as the air moves along the length of compressor 10 up to stage 8. Their velocity axially along compressor 10 is difficult to determine but is estimated to be from about 500 to about 550 feet per second during normal operation. Accordingly, the average air residence time in compressor 10 is a small fraction of one second. As a result, the finely-divided mist is present in a highly turbulent air stream and is probably at least partly vaporized as it moves through the stages prior to stages which operate at a temperature above the boiling point of water. As a result of the injection of the liquid, which is desirably water when air is the compressed gas, the temperature of the air is reduced in each stage by a small amount with the net result that the amount of work to compress the gas to the desired pressure is reduced. If the liquid is injected into the stages near the compressor discharge it may be necessary to pre-heat the liquid prior to injection to avoid thermal shock to the equipment. Not only is the amount of work required reduced, but also as a result of the reduction of temperature a larger mass of compressed gas can be produced from a compressor of a given size at a desired pressure. As well known to those skilled in the art, the temperature and density of the air increase rapidly as the gas is compressed. Since the increased temperature makes it more difficult to compress the gas, the cooling of the gas in at least a portion of the stages results in the production of a give mass of compressed gas at a given pressure at a lower temperature. Accordingly, the efficiency of compression is increased by the use of the progressive injection of the cooling liquid along the length of axial compressor 10.

Similarly, it is known that fouling of the blades in axial compressors is very detrimental to the efficiency of the compression operation. Accordingly, considerable effort has been devoted to determining how contaminants may be removed from the blades in axial and other compressors. In the article "Gas Turbine Compressor Washing State of the Art-Field Experiences," by Jean Pierre Stalder, referred to previously, it is recognized that pollution on the compressor blades is very detrimental to compressor operations. It pears from the article that the disclosed attempts to remove the pollution injected cleaning solutions only into the inlet gas.

Not only have attempts been made previously to clean pollution from the injector blades by injecting cleaning materials with the inlet gas, but attempts have also been made to improve compressor efficiency by cooling the inlet gas charged to the compressor. One attempt to achieve such cooling is the use of water spray mists, which are discharged into the inlet gas. The use of cooling mists in this fashion does not cool the compressor over any substantial portion of its length. The net result is simply an addition to the humidity of the gas at the inlet with little effect on the discharge temperature of the gas. By contrast, the use of the present invention to inject a cooling liquid along the length of compressor 10 results in substantial reduction in the amount of work required to compress the gas.

The clean water spray of the present invention is effective to clean the blades in the compressor stages. This is especially important in the first three stages. In these stages the air has a higher humidity and contains more particulates, which adhere to the blades more readily in the high humidity and the lower temperature conditions in the first three stages. The use of the spray is also effective in subsequent stages although the subsequent stages are somewhat less subject to fouling. The use of the sprays of the present invention can provide for operation of the compressor with less fouling and improved efficiency.

Figure 6:
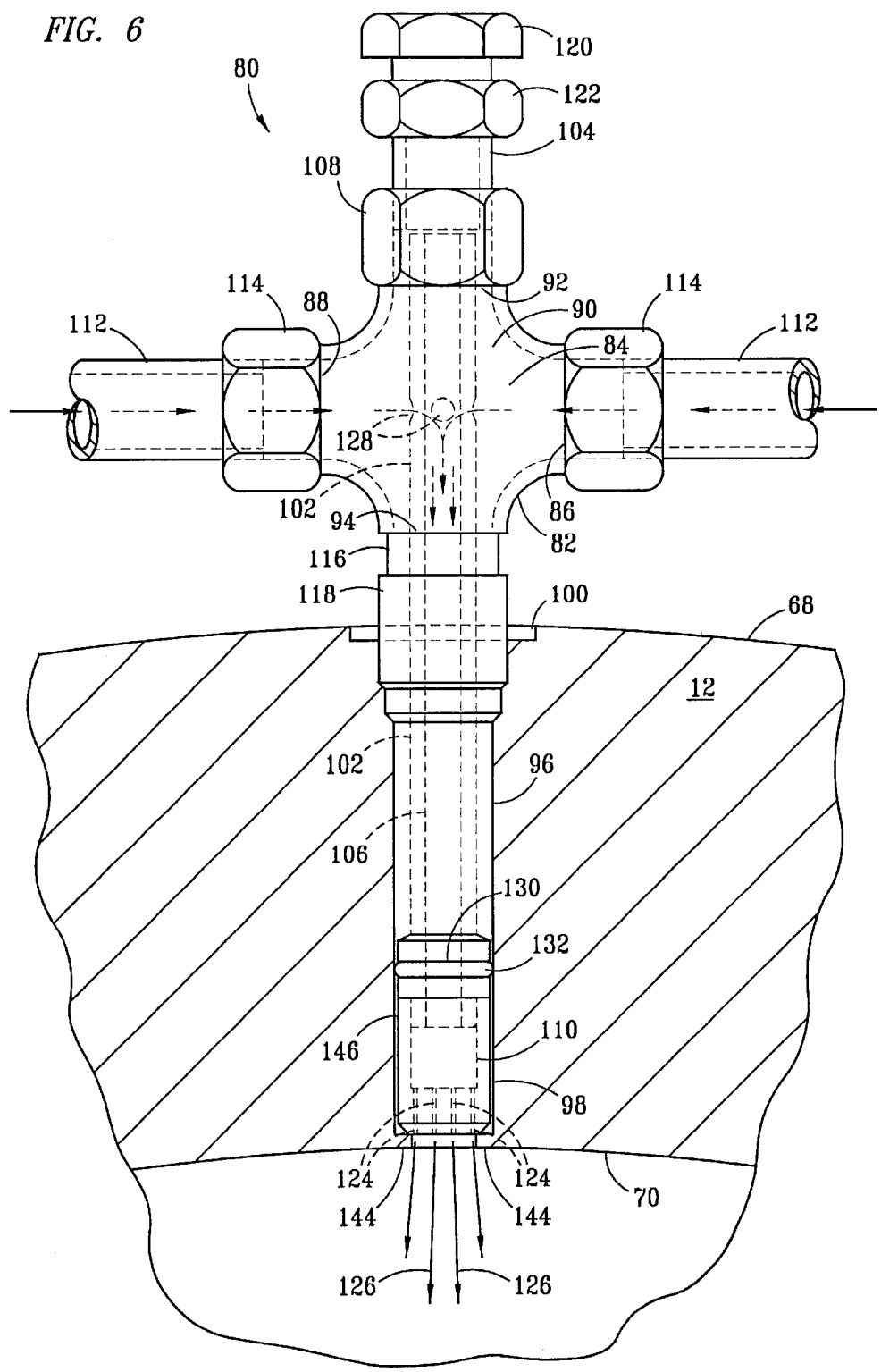
FIG. 6 is a schematic diagram of the nozzle assembly of he present invention.

FIG. 6 shows an embodiment 80 of a nozzle assembly for injecting a liquid, into a process vessel, which may be an axial multi-stage compressor. In the embodiment shown, a cross fitting body 82 having a first crossing passageway 84, which has a first end 86 and a second end 88 and a second crossing passageway 90, which has first end 92 and a second end 94 is shown. An outer housing 12 of a process unit, such as an axial compressor, is shown. The outer housing 12 has an outside 68 and an inside 70 and has a receptacle passage 96 extending through outer housing 12. Receptacle passage 96 has a first end 98 and a second end 100. A tubular member 102, having a first end 104 and second end 106, is positioned through the second crossing passageway 90 with second end 106 of tubular member 102 extending into and nearly through receptacle passage 96. Tubular member 102 extends through second crossing passage 90 and desirably extends from first end 92 of second crossing passage 90. A locking fitting 108 on second end 92 of second crossing passageway 90 is adapted to engage tubular member 102 to hold it in a desired position in second crossing passageway 90. Desirably, first end 104 of tubular ember 102 is closed so that liquid cannot flow from the tubular member out, through the first end. This may be accomplished by a plug 120 and a coupling 122 as shown. Any convenient method or structure can be used to close the first end of the tubular member. The cross fitting body 82 is sealingly joined at the second end of the second crossing passage ay 90 to a second end of receptacle passage 96. A fitting 118 is shown for this purpose. At tubing 116 may be used between fitting 118 and second end 94 of second crossing passageway 90. Fitting 118 may be used to connect these two components by screw threads, by welding or any other suitable method for joining. At the ends of first crossing passageway 84, fittings 114 are shown. These fittings are adapted to connect tubing 112 to each side of cross fitting body 82. In one embodiment, one of fittings 114 may be a cap, which effectively converts cross fitting body 82 into a tee fitting. This embodiment is useful when a single liquid inlet line is used. In this embodiment the cross fitting body 82 could be a tee fitting so long as second crossing passageway 90 is available and so long as liquid flow through line 112 is supplied to provide a body of liquid inside cross fitting body 82 to permit the flow of liquid into liquid inlet opening 128 in tubular member 102.

Tubular member 102 extends through at least a major portion of receptacle passageway 96. A nozzle 110 is positioned on a second end 106 of tubular member 102. This nozzle is positioned to receive liquid from tubular member 102 and spray the liquid through a plurality of opening 124 in an end 142 of nozzle 110. These openings are very small as discussed above, and are sized to provide a spray mist 126 of a liquid into the process unit. This is particularly critical when the liquid is sprayed into an axial compressor.

A groove 130 and an o-ring 132 are desirably positioned round an enlarged diameter section 134 of tubular member 102 to sealingly engage tubular member 102 and an inside of nozzle 110. These features are shown in greater detail in FIG. 7 and 8.

Figure 7:
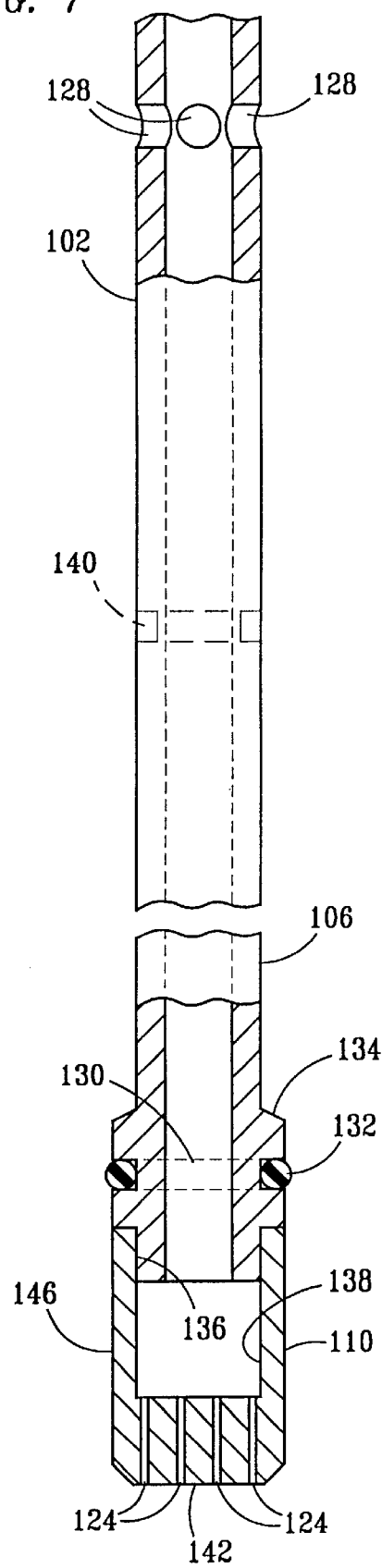
FIG. 7 is a schematic diagram of a section of a tubular member in the embodiment of FIG. 6; and, FIG. 8 is a schematic diagram of a lower section of the tubular member of FIG. 6.

In FIG. 7, enlarged diameter portion 134 is shown, including an o-ring groove 130 and an o-ring 132. Further, tubular member 102 includes on its first end 106 a reduced diameter section 136. This reduced diameter section is sized for an interference fit with the inside of the nozzle. The nozzle is formed of a relatively heavy walled material, which is very resistant to disintegration and passage into the inside of the axial compressor. Desirably, tubular member 102 is shrink-fit into nozzle 110. This provides a retaining engagement of nozzle 110 on tubular member 102. FIG. 7 also shows an optimal second o-ring groove 140.

Figure 8:
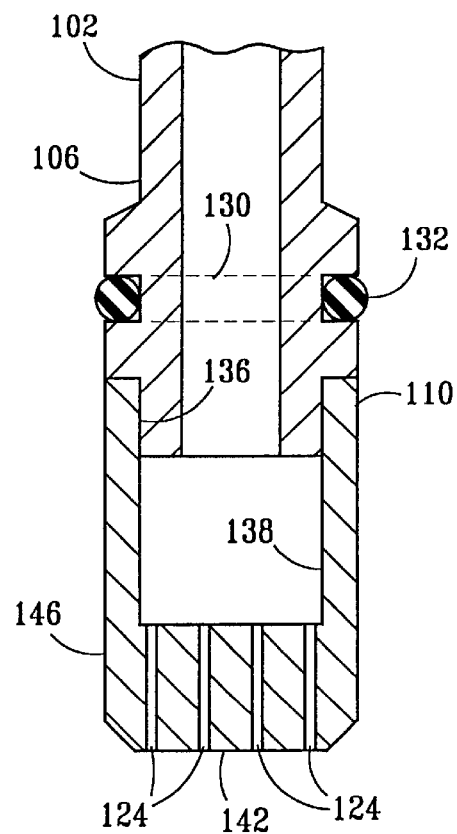

As shown in more detail in FIG. 8, a flow passage is provided from the inside of tubular member 102 to the nozzle.

While the tubular member, including the nozzle, is retained n position by blocking fitting 108, it is desirable that a very high degree of security be provided to prevent the movement of any portion of nozzle 110 or any other components o the assembly into the processing unit, especially if it is an axial compressor which including rapidly rotating components. Accordingly, a lip or reduced diameter section 144 is positioned at first end 98 of receptacle passage 96. This reduced diameter section has an inner diameter less than an outer diameter 146 of nozzle 110. Since nozzle 110 is fabricated of very durable material, nozzle 110 is effectively restrained from passage into the process it by the reduced diameter section 144. Since the nozzle is desirably produced of a very heavy-duty material, it is effectively prevents the passage of any other particulate material into the inside of the process unit.

In the operation of the assembly, liquid is passed via either of lines 112 into first crossing passageway 84, where the liquid flows through a plurality openings 128 into tubular member 102. This liquid then flows downwardly through the tubular member and out through the openings in the nozzles into the process unit as a fine mist.

Desirably, the holes in nozzle 110 are very small and may be drilled by laser or otherwise so that a very fine mist of injected liquid is injected into the process unit.

It will be noted that by loosening locking fitting 108 tubular member 102 can be withdrawn from receptacle passage 96. This permits repairs to be made to the tubular member, cleaning of the nozzle, and the like. Of course, it is necessary to discontinue the liquid flow through lines 112 during the removal and during the absence of tubular member 102. If it is desired to remove the assembly, lines 112 can be disengaged via fittings 114. The assembly can be removed and a plug inserted in the second end of receptacle passage 96. A refurbished or replacement tubular member can be reinserted by reversing the procedure above.

The liquid supply lines 112 are as shown in FIG. 5 with the exception that the flow lines around the outside of outer housing 12 and generally parallel to the exterior of housing 102. As noted above, in the event that it is desired to run a single liquid line supply to the assembly, only one of lines 112 is required for the injection of liquid using the assembly described above.

The materials of construction are readily available to those skilled in the art. For instance, the tubular member may be machined from one-half inch OD SS3-16L tubing, having a 3/16-inch wall thickness. The end of the tube may be machined for a 0.0005-inch interference fit with the nozzle. The nozzle may be machined from round bar stock SS316-L. For instance, four 0.010 to 0.015 inch holes may be drilled as the outlets from nozzle 110. The inside of the nozzle is also machined to accommodate the 0.0005 interference fit with the end of the tubular member. A variation of sizes is possible with respect to the foregoing dimensions since the variable size receptacle passages, tubular members and the like may be used.

Further the tubular member is required to be straight within tolerance limits sufficient to permit positioning it through body 82 and receptacle passage 96. Desirably the tubular member is sized to fit closely in these spaces.

Having thus described the invention by reference to certain of its preferred embodiments, it is respectfully pointed out that the embodiments are illustrative rather than limiting in nature and that many variations and modifications are possible within the scope of the present invention. Many such variations and modifications may be considered obvious and desirable to those skilled in the art based upon a review of the foregoing description of preferred embodiments.

Having thus described the invention, we claim:

1. A nozzle assembly for injecting a liquid into a process unit through a process unit outer wall, the assembly comprising:

a) a cross fitting body having at least one of a first and a second crossing passageway therethrough each of the crossing passageways having a first and a second end;

b) a liquid inlet into at least one end of the first crossing passageway;

c) a receptacle passage having a first and a second end and positioned to extend through the process unit outer wall with the second end of the second crossing passageway being sealingly connected to first end of the receptacle passage;

d) a tubular member having a first and a second end with the first end of the tubular member being closed to liquid flow from the tubular member through the first end of the tubular member, the tubular member being positioned through the second crossing passageway with the second end of the tubular member extending into the receptacle passage;

e) a locking fitting positioned on the body at the second end of the second crossing passageway;

f) at least one liquid inlet into the tubular member from the first crossing passageway; and, g) a nozzle positioned on the second end of the tubular member and positioned to spray the liquid from the tubular member into the process unit through a plurality of openings in the nozzle.

2. The assembly of claim 1 wherein the process unit is an axial compressor.

3. The assembly of claim 1 wherein the assembly includes at least one liquid inlet line in liquid communication with the first crossing passageway.

4. The assembly of claim 1 wherein the receptacle passage includes at its first end a reduced diameter section having a diameter less than an outer diameter of the nozzle.

5. The assembly of claim 1 wherein a plug is positioned in the second end of the first crossing passageway and wherein a liquid inlet line is positioned in liquid communication with the first end of the first crossing passageway.

6. The assembly of claim 1 wherein the locking fitting removeably maintains the tubular member in a selected position in the second passageway.

7. The assembly of claim 1 wherein the tubular member includes near its second end an enlarged diameter portion.

8. The assembly of claim 7 wherein the enlarged diameter portion of the tubular member includes a groove configured to retain an o-ring in sealing engagement between the enlarged diameter portion and the receptacle passage.

9. The assembly of claim 8 wherein the tubular member includes a reduced diameter section on its second end.

10. The assembly of claim 9 wherein the reduced diameter section is positioned in engagement with an inside of the nozzle.

* * * * *